No. 703,283. Patented June 24, 1902.
F. LEMAIRE.
DETONATOR FOR RAILWAYS.
(Application filed Mar. 21, 1901.)
(No Model.)
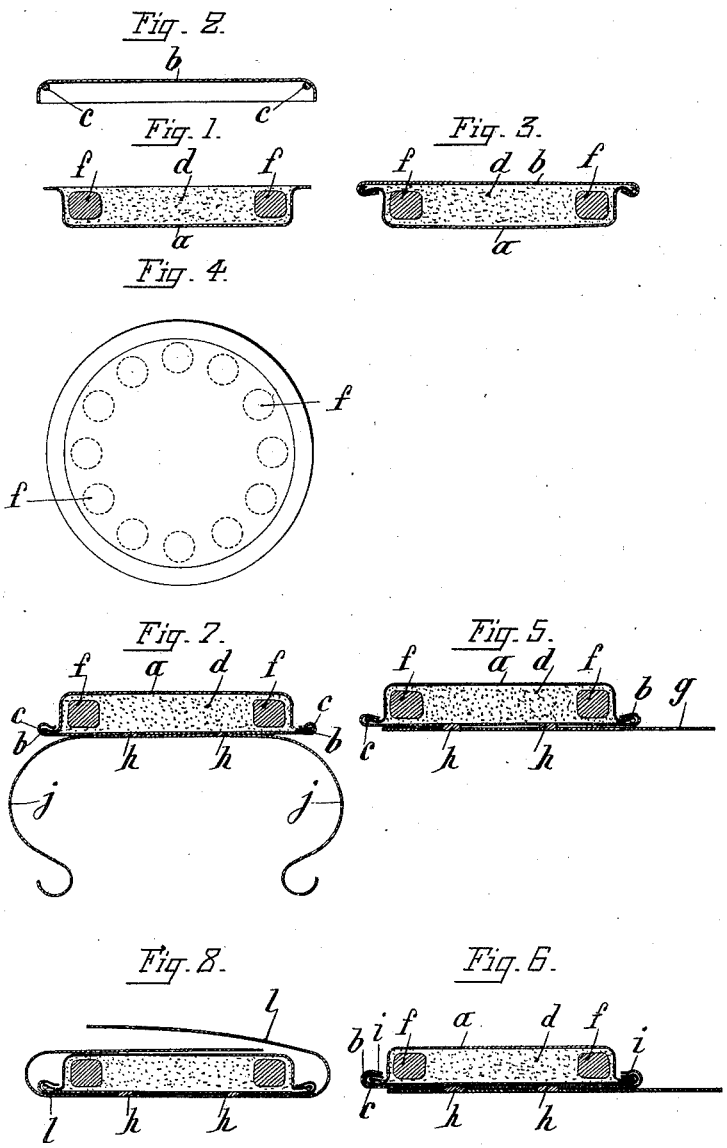

UNITED STATES PATENT OFFICE.

FELIX LEMAIRE, OF PARIS, FRANCE.

DETONATOR FOR RAILWAYS.

SPECIFICATION forming part of Letters Patent No. 703,283, dated June 24, 1902.

Application filed March 21, 1901. Serial No. 52,166. (No model.)

*To all whom it may concern:*

Be it known that I, FELIX LEMAIRE, engineer, of 30 Rue Notre-Dame des Victoires, in the city of Paris, Republic of France, have invented Improvements Relating to Detonators for Railways, of which the following is a full, clear, and exact description.

This invention relates to a detonating signal for railways.

The object of my invention is to provide a detonator which shall possess the advantage of exploding loudly upon the passage of the first vehicle or of the locomotive, while the explosion is always audible by the driver.

My improved detonator does not injure or deteriorate either the rail or the tire of the wheels and in addition affords great security, owing to the certainty of its operation, and is also adapted to resist accidental shocks which may arise from falls during transportation or from knocks or blows during storage. By way of example, I may state that it does not explode from the shock produced by a weight of ten pounds falling thirty inches. The fulminant substance and the grains or particles of hard material upon which it is crushed on the passage of the vehicle always remain in their original position so long as the detonator has not been utilized, these substances being embedded in a suitable agglutinant paste.

The fulminant composition is constituted by a mixture of chlorate of potash with a sulfo-cyanid (solid in the temperature prevailing in the temperate zone) in the proportion of about fifty per cent. of chlorate of potash and about fifty per cent. of sulfo-cyanid. I prefer to employ sulfo-cyanid of lead, but may also use sulfo-cyanid of copper, of mercury, of ammonia, or the like. The mixture thus constituted not only presents the advantage of producing a very loud explosion, but in addition it does not shatter or fracture the rail or tire of the wheel. For example, a charge of twenty-three grams inserted in my improved detonator produces a detonation which is always audible by the driver even when the train is running at a speed of over sixty miles per hour, while with other explosive substances—such as fulminate of mercury, for example, or a mixture of chlorate of potash and sulfid of antimony—the detonation would be much feebler and the rail or the tire of the wheel would be fractured, as I have found by experience.

My improved composition is agglutinated by means of a mucilaginous body, such as gum-tragacanth, which is soluble in water. The whole is triturated in such a manner as to form a very firm homogeneous paste. By desiccation this mixture is rendered of a hard consistency not liable to deformation. It is, however, sufficiently elastic to deaden any accidental shock, so that no explosion will be produced thereby. Instead of gum-tragacanth I may employ other mucilaginous bodies enabling sufficient consistency and elasticity to be obtained—such, for example, as gum-arabic, dextrine, linseed-oil boiled with litharge, varnishes soluble in alcohol, and the like.

In the mixture above described and before its desiccation I introduce particles or grains of porcelain, marble, or glass, either solid or perforated. Each of these grains forms an anvil, so to speak, upon and between which the fulminant substance is crushed when the vehicle passes over the detonator.

In the accompanying drawings I have represented several constructional forms of my improved detonator, reference to which will render my invention readily intelligible.

Figure 1 is a sectional view of a detonator. Fig. 2 shows the cover with the ring of india-rubber or other elastic material serving to form a tight joint. Fig. 3 is a section through the detonator with its cover in place. Fig. 4 is a plan view of the detonator with cover removed, showing the grains of hard material embedded in the paste. Fig. 5 represents in section the detonator provided with a tailpiece riveted or adapted to be soldered or otherwise fixed upon its cover. Fig. 6 is also a section through a detonator provided with a tailpiece which instead of being fixed directly to the lid is riveted or soldered to an independent sole-plate, which is then pressed or lapped upon the detonator. These two arrangements, Figs. 5 and 6, are especially applicable when the detonator instead of being placed upon the rail is arranged upon a signal. Fig. 7 is a section through a detonator provided with an elastic steel attachment by means of which it may be instantly and directly attached to the rail. Fig. 8 is likewise a section through a detonator provided with a bent flexible band of copper or brass. This band may be readily unbent for the purpose of attaching the detonator to the rail.

In the figures similar letters of reference are employed to designate like parts.

*a* is the body of the detonator, and *b* the lid of tenacious but ductile brass for preventing any projection of the particles upon explosion taking place. These parts may be varnished in order to insure their preservation.

*c* is the ring, of india-rubber, leather, or other elastic or flexible material, insuring the tightness of the joint between the body of the detonator and its cover when this latter is bent or lapped upon the former.

*d* is the paste formed by the mixture of the explosive and the agglutinant material.

*f f* are the grains or particles of marble, porcelain, glass, or the like, which are arranged within a circumference approximately that of the detonator itself. These grains are pressed into the paste in such a manner that there remains between them and the top and bottom of the detonator but a very small interval, (say nine-tenths of a millimeter.) These grains, embedded and isolated one from the other in this manner, are not capable of displacement, since they are imprisoned in the paste, which has been solidified by desiccation. When the wheel of the vehicle passes over the detonator, the fulminant material arranged between the envelop of the detonator and the grains of hard material is crushed, thus causing deflagration in the same manner as the hammer of a gun striking on a cap upon a nipple.

*g* is the tailpiece of the detonator, Figs. 5 and 6, adapted for use on signals.

*h h* are the rivets attaching the tailpiece either directly to the cover of the detonator, Fig. 5, or upon an independent sole-plate, which is then pressed or lapped upon the detonator, Fig. 6.

*j* is the elastic steel attachment, and *l* a band of copper or other soft metal which may be employed instead of the attachment or clip *j*. These fixing parts *j* and *l* serve for attaching the detonator to the rail.

It will be seen from the last four figures that the rivets of the tailpieces and of the clips are not arranged opposite the grains or particles of hard material in order to obviate any accidental explosion owing to shocks which may take place when the detonator is being placed in position or at any other time.

I claim—

1. A detonator for railways, comprising a body portion or receptacle provided with a cover, and inclosing the detonating substance mixed with an agglutinant to form a paste, and grains or particles of marble, glass or porcelain circumferentially arranged in said receptacle, the said grains being retained in position by the paste and being of such size as to extend within a short distance of the top and bottom of the detonator, to insure the detonation by the crushing due to the wheel of the vehicle.

2. A detonator for railways, comprising a body having a cover and containing the detonating substance mixed with an agglutinant to form a paste, grains or particles of marble, glass or porcelain circularly arranged in the body and embedded in the paste, and spaced a short distance from the top and bottom of the detonator, and attaching devices secured to the detonator, the fastening means for the attaching devices being out of alinement with the said grains or particles to prevent accidental detonation.

3. A detonator for railways, comprising a body portion for containing the detonating substance mixed with an agglutinant, and a cover for the body, grains or particles of marble, glass or porcelain circumferentially arranged in said body and embedded in the detonating compound or paste, attaching devices connected with the detonator at points out of alinement with the said grains or particles, and a ring of elastic or flexible material interposed between the cover and the body of the detonator for the purpose of securing a tight joint.

4. A detonator, comprising a receptacle containing the explosive material, and a series of grains or particles of a hard and frangible material embedded in the explosive material and each spaced a short distance from the top and bottom of the receptacle, substantially as described.

5. A detonator, comprising a receptacle for the explosive material, a series of grains or particles of a hard and frangible material embedded in the explosive material within the receptacle, and each spaced a short distance from the top and bottom of the receptacle, and attaching devices secured to the receptacle at points out of alinement with the said grains or particles, substantially as described.

The foregoing specification of my improvements relating to detonators for railways signed by me this 6th day of March, 1901.

FELIX LEMAIRE.

Witnesses:
EDWARD P. MACLEAN,
MAURICE H. PIGNET.